United States Patent [19]

Riech et al.

[11] 4,324,126
[45] Apr. 13, 1982

[54] CALIBRATION DEVICES

[75] Inventors: Volker Riech; Wolfgang Saupe; Dietrich Sorgenicht, all of Leverkusen, Fed. Rep. of Germany

[73] Assignee: Daystrom Limited, Glouchester, England

[21] Appl. No.: 151,570

[22] Filed: May 20, 1980

[30] Foreign Application Priority Data

May 21, 1979 [DE] Fed. Rep. of Germany ....... 2920529

[51] Int. Cl.³ .............................................. G01B 9/00
[52] U.S. Cl. ..................................... 73/1 J; 219/354
[58] Field of Search .................. 73/355 R, 159, 1 R, 73/1 F, 1 J; 356/243, 46; 219/354

[56] References Cited

U.S. PATENT DOCUMENTS

| | | | |
|---|---|---|---|
| 3,316,764 | 5/1967 | Nelson | 356/46 |
| 4,103,277 | 7/1978 | Griffin | 219/354 |
| 4,241,292 | 12/1980 | Kreick | 219/354 |

FOREIGN PATENT DOCUMENTS

| | | |
|---|---|---|
| 718824 | 11/1954 | United Kingdom . |
| 780201 | 7/1957 | United Kingdom . |
| 856539 | 12/1960 | United Kingdom . |
| 859180 | 1/1961 | United Kingdom . |
| 1074124 | 6/1967 | United Kingdom . |
| 1089471 | 11/1967 | United Kingdom . |

*Primary Examiner*—S. Clement Swisher
*Attorney, Agent, or Firm*—Dale Gaudier; Mikio Ishimaru

[57] ABSTRACT

A calibration device for calibrating gauges for measuring the width, diameter or length of luminous material, such as hot strip-, rod- or tube-like material, comprises an elongated tube of sintered quartz having an elongated light source disposed along its axis. The quartz has good dimensional stability, and diffuses the light produced by the source. It therefore simulates the hot luminous material normally measured by the gauge, without itself being very hot.

8 Claims, 1 Drawing Figure

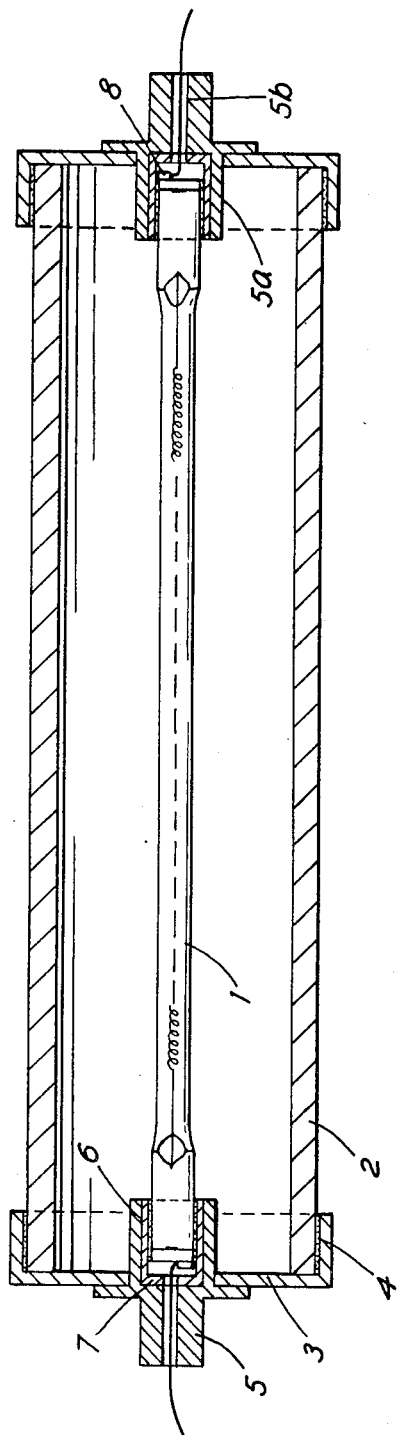

CALIBRATION DEVICES

This invention relates to calibration devices for calibrating gauges for measuring a dimension, eg the width, diameter or length, of luminous material such as hot strip-, rod- or tube-like material as it is being produced.

Several different kinds of gauges for making dimensional measurements of hot material are known. One kind, for example, is described in German Patent Specification No. OLS 2,140,939, according to which the material whose width is to be measured is illuminated from behind by a source of collimated light so as to project an image of the material on to a row of photodiodes disposed on the opposite side of the material to the light source.

In order to calibrate such a gauge, it has hitherto been customary to use precision test bars of low-slag steel, heated either by means of gas-burners of differing flame-size or electrically with the aid of electrical heating elements, in order to simulate the hot rolled material. Calibrating in this manner is, however, subject to the disadvantage that the test bars undergo considerable thermal expansion at the temperature to which they must be heated, so that the actual values of the dimensions of the test bars when they are in the incandescent condition cannot be reproduced with sufficient accuracy. In addition, it is not really practical to use such test bars on site (ie where the gauge is actually being used), because of the considerable expense of the associated heating apparatus involved. Moreover the use of gas-burners can involve considerable noise nuisance. Apart from this, there are also problems in changing the hot test bars, so that a great deal of time is taken up in calibrating because of the necessity to let the test bars cool down before they are changed.

The object of the invention is therefore to provide a calibration device for use with such gauges, which device can be made with the desired accuracy and is dimensionally stable, and furthermore supplies the desired colour temperature, while at the same time being capable of being changed relatively easily.

According to the present invention, there is provided a calibration device for calibrating apparatus for measuring a dimension of luminous material, the device comprising a hollow elongated member made from a translucent, temperature-resistant material having a relatively low coefficient of thermal expansion, said member having an elongated light source disposed along its longitudinal axis, whereby in use, the device simulates such luminous material.

In a preferred embodiment of the invention, the translucent, temperature-resistant material is sintered quartz, and the hollow member made therefrom is preferably tubular.

A light-source in the form more particularly of a bright infra-red radiator may be used in the case of fairly large devices, and a spiral filament capable of being made incandescent in the case of fairly small devices.

The sintered quartz tube is translucent and leads to diffused light-emission, in which case the temperature of the simulated emission may be set to correspond approximately to a calibration curve by suitable choice of the voltage at which the light-source is operated. Additionally, the sintered quartz tube may be made with very great accuracy, since it may be accurately ground to predetermined dimensions. Since quartz has a relatively low coefficient of thermal expansion, and furthermore is not very strongly heated by the light-source, the calibration device has good dimensional stability and may be readily and easily changed; in practice, the device is heated by the light-source only to about 100° C., and its temperature drops immediately after the light-source has been turned off, so that it can be readily grasped with gloves or the like.

The invention will now be described, by way of example only, with reference to the accompanying drawing, which is a longitudinal sectional view of a calibration device (or bar) in accordance with the present invention.

The calibration device or bar illustrated in the drawing consists of an elongated light-source in the form of an infra-red quartz radiator 1, the radiator being arranged on the axis of a sintered quartz tube 2 ground to predetermined dimensions. Metal centering caps 3 are fitted at both ends of the tube 2 to centre the radiator 1 therein, a respective corrugated strip 4 of spring steel being arranged between the external surface of each end of the tube 2 and the adjacent internal surface of the respective centering cap 3 to resiliently suspend the tube in the centering caps.

The centering caps 3 are provided with central apertures, into each of which is inserted a centering flange 5 which is linked to the centering cap 3 by screws or the like. The centering flange 5 has an extension 5a, into which are inserted an insulating disc 7 and a quartz glass sleeve 6 adjacent thereto. The radiator 1 is received by the insulating sleeves 6, and may be cemented to them.

The insulating sleeves 6 also serve to reduce the heat-transfer from the radiator 1 to the centering flanges 5 and to the centering caps 3. The leads to the respective electrical connections 8 at each end of the radiator 1 are passed through a respective central bore 5b in each centering flange 5 and its associated insulating disc 7. These leads may for example be insulated with stranded Teflon.

The calibration device or bar illustrated in the drawing retains its dimensional stability as regards its external diameter even in the radiating condition when a bright infra-red radiator 1 is used, since the tube 2 itself does not assume the temperature of the radiator 1, and the coefficient of expansion of sintered quartz is very low.

Various modifications can be made to the described embodiment of the invention. For example, other suitable translucent, temperature resistant materials having a relatively low coefficient of thermal expansion, eg fused silica glass, can be used in place of sintered quartz. In this specification, the term "translucent" is to be understood to mean capable of transmitting and diffusing light, including infra red light.

We claim:

1. A calibration device for calibrating apparatus for measuring a dimension of hot luminous material, the device comprising a hollow elongated member made from a translucent, temperature-resistant material having a relatively low coefficient of thermal expansion, said member having an elongated light source disposed along its longitudinal axis but spaced from the internal surface thereof to reduce heat transfer therebetween, whereby in use, the device simulates such luminous material while operating with said member at a substantially lower temperature than that of such luminous material.

2. A calibration device as claimed in claim 1, wherein the translucent, temperature-resistant material is sintered quartz.

3. A calibration device as claimed in claim 1 or claim 2, wherein the light source is an infra red luminous radiator.

4. A calibration device as claimed in claim 1 or claim 2, wherein the light source is a spiral filament.

5. A calibration device as claimed in claim 1 or claim 2, wherein the hollow member is tubular.

6. A calibration device as claimed in claim 5, wherein the hollow member comprises centering caps at its ends, each cap being provided with a respective holder for a respective end of the light source.

7. A calibration device as claimed in claim 6, wherein the hollow member is mounted in each of the centering caps by respective resilient mounting means.

8. A calibration device as claimed in claim 7, wherein each resilient mounting means comprises a corrugated strip of spring steel arranged between the external surface of the hollow member and the adjacent internal surface of the respective centering cap.

* * * * *